even if (12) United States Patent
McCord et al.

(10) Patent No.: US 9,274,224 B2
(45) Date of Patent: Mar. 1, 2016

(54) GLOBAL POSITIONING SYSTEM SPEEDOMETER

(71) Applicants: Keith McCord, Florissant, MO (US);
Kevin Terry, Uncasville, CT (US);
Frank R. Ahlbin, Jr., Chshire, CT (US)

(72) Inventors: Keith McCord, Florissant, MO (US);
Kevin Terry, Uncasville, CT (US);
Frank R. Ahlbin, Jr., Chshire, CT (US)

(73) Assignee: Thomas G. Faria Corporation, Uncasville, CT (US)

( * ) Notice: Subject to any disclaimer, the term of this patent is extended or adjusted under 35 U.S.C. 154(b) by 0 days.

(21) Appl. No.: 14/177,906

(22) Filed: Feb. 11, 2014

(65) Prior Publication Data

US 2014/0225754 A1    Aug. 14, 2014

Related U.S. Application Data

(60) Provisional application No. 61/764,734, filed on Feb. 14, 2013.

(51) Int. Cl.
*G01S 19/52* (2010.01)
*G01S 19/00* (2010.01)
*G01S 19/13* (2010.01)
*G08G 1/052* (2006.01)
*B60K 37/00* (2006.01)
*G01S 19/34* (2010.01)

(52) U.S. Cl.
CPC .................. *G01S 19/00* (2013.01); *B60K 37/00* (2013.01); *G01S 19/13* (2013.01); *G01S 19/34* (2013.01); *G01S 19/52* (2013.01); *G08G 1/052* (2013.01)

(58) Field of Classification Search
CPC .......... G01S 19/00; G01S 19/13; G08G 1/052
See application file for complete search history.

(56) References Cited

U.S. PATENT DOCUMENTS

| 6,353,781 | B1 * | 3/2002 | Spivak | 701/21 |
| 6,664,932 | B2 * | 12/2003 | Sabet et al. | 343/770 |
| 6,683,570 | B2 * | 1/2004 | Skladany et al. | 343/700 MS |
| 6,707,426 | B2 * | 3/2004 | Shigihara et al. | 343/700 MS |
| 6,906,669 | B2 * | 6/2005 | Sabet et al. | 343/700 MS |
| 6,919,853 | B2 * | 7/2005 | Jordan et al. | 343/770 |
| 7,173,569 | B1 * | 2/2007 | Smith | 343/709 |

(Continued)

*Primary Examiner* — Van Trieu
(74) *Attorney, Agent, or Firm* — Michael A. Blake (57) ABSTRACT

A GPS speedometer comprising: a housing; a circuit board located in the housing; a microprocessor located on the circuit board; a GPS module located on the circuit and in signal communication with the micro-processor; a GPS antenna located on the circuit board and in signal communication with GPS module; and a readable speedometer display located on the housing and in signal communication with the microprocessor, where the readable speedometer display is configured to display the current speed of the vessel or vehicle calculated by the microprocessor based on data from a global positioning system. A GPS speedometer system comprising: a vessel, the vessel comprising an instrument panel; a GPS speedometer located on the instrument panel, the GPS speedometer comprising: a housing; a circuit board located in the housing; a microprocessor located on the circuit board; a GPS module located on the circuit and in signal communication with the micro-processor; a GPS antenna located on the circuit board and in signal communication with GPS module; a readable speedometer display located on the housing and in signal communication with the microprocessor, where the readable speedometer display is configured to display the current speed of the vessel or vehicle calculated by the microprocessor based on data from a global positioning system; and a global positioning satellite in signal communication with the GPS antenna.

16 Claims, 9 Drawing Sheets

(56) References Cited

U.S. PATENT DOCUMENTS 7,460,950 B2 * 12/2008 Wurth .......................... 701/32.4
7,596,448 B2 * 9/2009 Suzuki et al. ................. 701/444
2002/0175879 A1 * 11/2002 Sabet et al. ................... 343/895

* cited by examiner

GLOBAL POSITIONING SYSTEM SPEEDOMETER

CROSS-REFERENCES

This patent application claims the benefit of provisional patent application No. 61/764,734; by Keith McCord, Kevin Terry, and Frank R. Ahlbin, entitled "Global Positioning System Speedometer", filed on Feb. 14, 2013, and which provisional application is fully incorporated by reference herein.

TECHNICAL FIELD

The invention relates to an electronic speedometer, and more specifically to an electronic speedometer with a global positioning system (GPS) antenna located on an internal circuit board inside the electronic speedometer.

BACKGROUND

All known GPS speedometers use an external GPS antenna when in communication with a GPS. However, there are many problems with using an external GPS antenna. It is often difficult and sensitive to route the antenna wiring throughout the vessel or vehicle, as well as the susceptibility of this antenna to damage from exposure to the environment. An external GPS antenna and the associated wiring require expensive environmentally sealed and resistant coatings and materials, plus the basic costs of a separate enclosure unit of the antenna itself increase the costs of such a speedometer system. Additional costs and complexity rise since the external antenna requires an internal battery (power source) to retain location information for quick TTFF (Time To First Fix) as typically required of a GPS. When this battery ultimately dies, approximately 3 years after installation, the external antenna ceases to provide quick TTFF.

Currently, all GPS speedometer indication instruments (gauge type indicators) require external antennas for acquiring a GPS signal.

Thus there is a need for a GPS speedometer that overcomes the above listed and other disadvantages.

SUMMARY OF THE INVENTION

The disclosed invention relates to a GPS speedometer comprising: a housing; a circuit board located in the housing; a microprocessor located on the circuit board; a GPS module located on the circuit and in signal communication with the micro-processor; a GPS antenna located on the circuit board and in signal communication with GPS module; and a readable speedometer display located on the housing and in signal communication with the microprocessor, where the readable speedometer display is configured to display the current speed of the vessel or vehicle calculated by the microprocessor based on data from a global positioning system.

In addition, the disclosed invention relates to a GPS speedometer system comprising: a vessel, the vessel comprising an instrument panel; a GPS speedometer located on the instrument panel, the GPS speedometer comprising: a housing; a circuit board located in the housing; a microprocessor located on the circuit board; a GPS module located on the circuit and in signal communication with the micro-processor; a GPS antenna located on the circuit board and in signal communication with GPS module; a readable speedometer display located on the housing and in signal communication with the microprocessor, where the readable speedometer display is configured to display the current speed of the vessel or vehicle calculated by the microprocessor based on data from a global positioning system; and a global positioning satellite in signal communication with the GPS antenna.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

The disclosed GPS speedometer has the GPS antenna located directly on the internal circuit board of the speedometer instrument itself. Software is written in the microprocessor that is also installed on this circuit board, which takes advantage of the close proximity of the GPS antenna. A microprocessor is a multipurpose, programmable device that accepts digital data as input, processes it according to instructions stored in its memory, and provides results as output. The microprocessor may be generally configured to or programmed to execute software instructions stored on a computer readable tangible, non-transitory medium.

The disclosed GPS speedometer may be a self-contained, all-in-one combination of speedometer indication, heading indicator and GPS antenna.

This invention is as easy to install as a gauge (indicator) speedometer type of installation, using just power and ground for an electrical system. Once the GPS speedometer is connected to power and ground, the device is fully functional—it requires no further input from the installer or user. This gauge may be installed or mounted into a round hole in an instrument panel of a vessel or vehicle. The shape of the speedometer may be generally circular, however, other shapes for the speedometer may be used, including but not limited to oval, square, rectangular, parallelogram, circular, etc.

Figure 1:
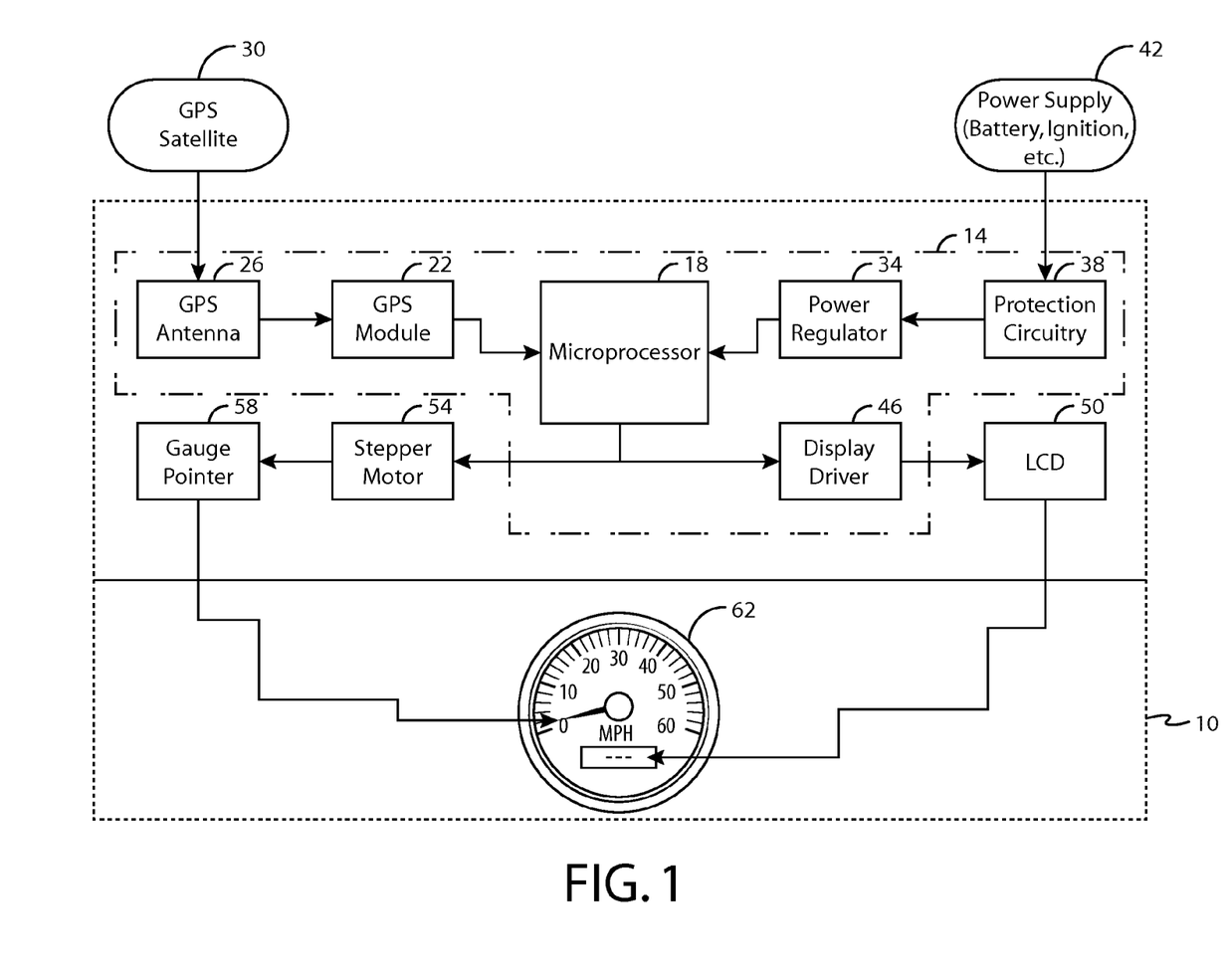
FIG. 1 is a schematic drawing of the disclosed GPS speedometer.
Figure 2:
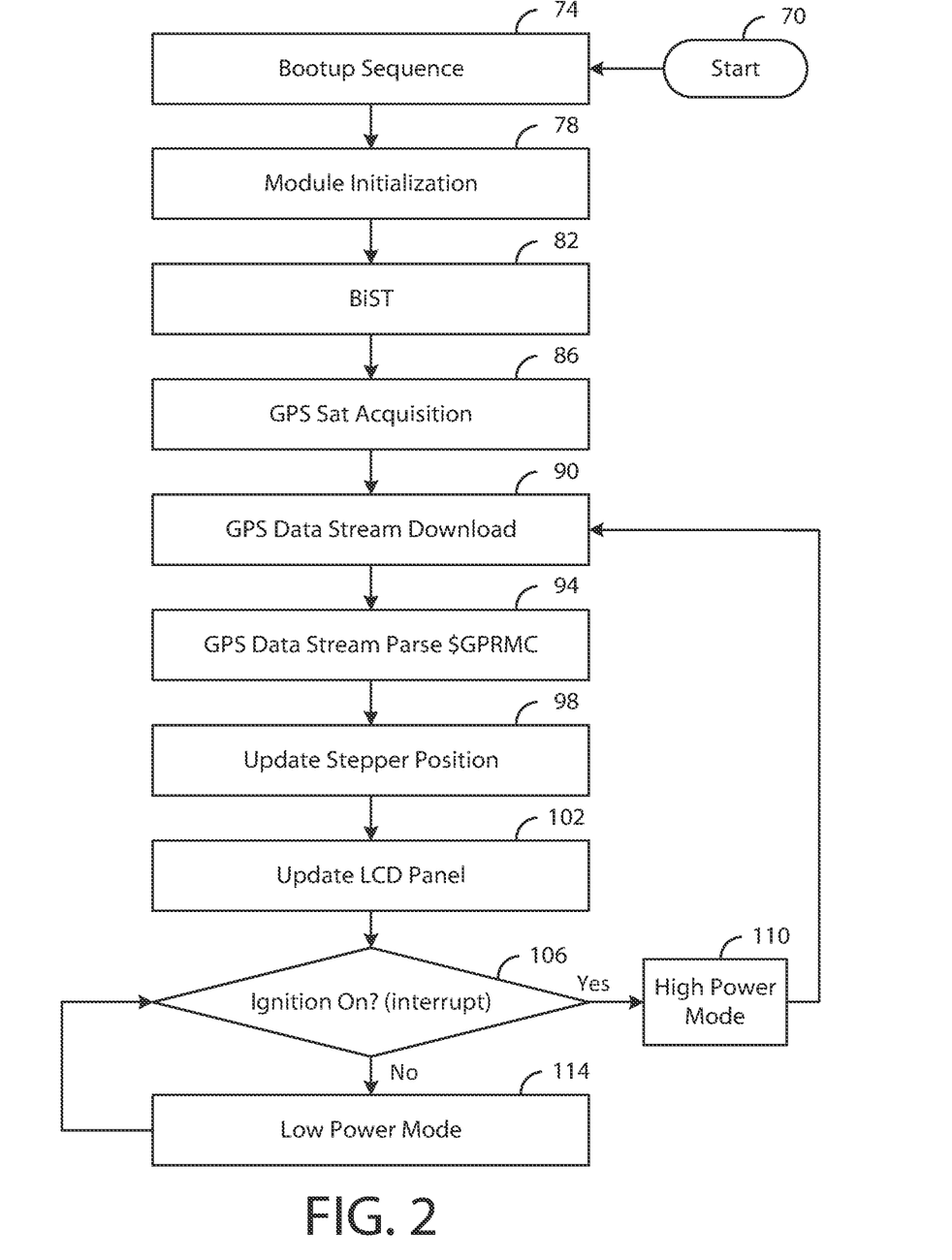
FIG. 2 is a flowchart illustrating one method showing how the GPS speedometer operates.

FIG. 1 is a schematic diagram of the disclosed GPS speedometer. The box (dashed line) 10 represents the GPS speedometer and shows the components and processes within the GPS speedometer. The GPS speedometer 10 comprises a circuit board 14 represented by the dotted-dashed box. A microprocessor 18 is located on the circuit board 14. A GPS module 22 is also located on the circuit board 14 and is in signal communication with the microprocessor 18. A GPS antenna 26 is also located on the circuit board, and is in signal communication with the GPS module 22. The GPS antenna 26 is configured to communicate with one or more GPS satellites 30. A power regulator 34 may also be located on the circuit board 14, and may be in signal communication with the microprocessor 18. Protection circuitry 38 may also be located on the circuit board 14, and be in signal communication with the power regulator 34. The protection circuitry 38 is configured to be in operable communication with a power supply 42 located externally to the speedometer 10. In one embodiment, a display driver 46 located on the circuit board is in signal communication with the microprocessor 18. In another embodiment, the display driver 46 may be located in the speedometer 10 but not on the circuit board 14. The display driver 46 is in signal communication with a LCD 50 located in the speedometer and configured to be viewable by users on a vessel or a vehicle. The LCD may be configured to provide a numeric representation of course over ground compass cardinal heading. The LCD 50, in one embodiment, is not located on the circuit board 14. A stepper motor 54 is located in the speedometer 10 and is in signal communication with the microprocessor 18. The stepper motor 54 is in operable communication with a gauge pointer 58. The gauge pointer 58 is located in the speedometer and configured to be viewable by users on vessel or vehicle. The gauge pointer 58 may be configured to show a graphical representation of speed on the gauge dial face 62. In one embodiment, the gauge pointer 58 and LCD 50 may be on a single gauge dial face 62 as shown. The gauge dial face 62 will generally be on visible to users on the vessel or vehicle. There is no external GPS antenna required for this speedometer 10. When operating, the gauge dial face 62 will indicate an accurate speed over ground reading. In addition, the gauge dial face 62 may have a heading display 14 that will give an accurate heading of the vehicle. In other embodiments, the stepper motor 54, gauge pointer 58, and gauge dial face 62 may be replaced with a digital display, such as, but not limited to an LCD or LED display, FIG. 2 is a flowchart illustrating one method showing how the GPS speedometer 10 operates. At act 70, the system starts. At act 74, the system goes through a bootup sequence. At act 78, the system goes through a module initialization. At act 82, the system goes through a built-in self-test. At act 86, the system performs a GPS satellite acquisition process. At act 90, the system begins a GPS data stream download. At act 94, the systems performs a GPS data stream parse $GPRMC. At act 98, the system updates the stepper position with the correct speed over ground reading. At act 102, the system updates the LCD with the correct heading. At query 106, the system determines whether the vessel or vehicle ignition is on. If on, then at act 110, the system is placed in or remains in a high power mode. If off, then at act 114, the system is placed in a low power mode.

Figure 3:
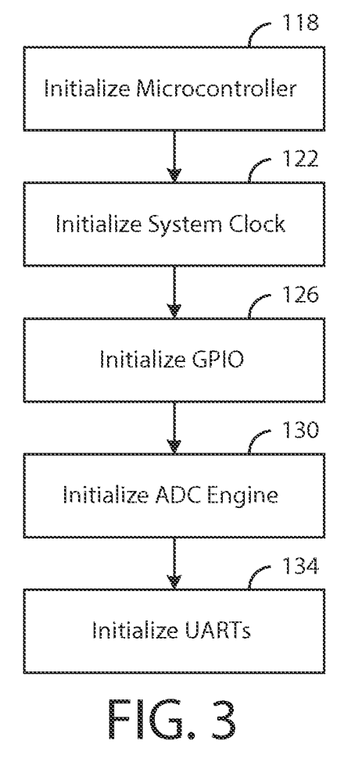
FIG. 3 is a flowchart illustrating the bootup sequence from FIG. 2.

FIG. 3 is a flowchart illustrating the bootup sequence from FIG. 2. At act 118, the microcontroller is initialized. At act 122 the system clock is initialized. At act 126 the general-purpose input/output (GPIO) is initialized. At act 130 the analog to digital controller (ADC) engine is initialized. At act 134, the universal asynchronous receiver/transmitters (UART) are initialized.

Figure 4:
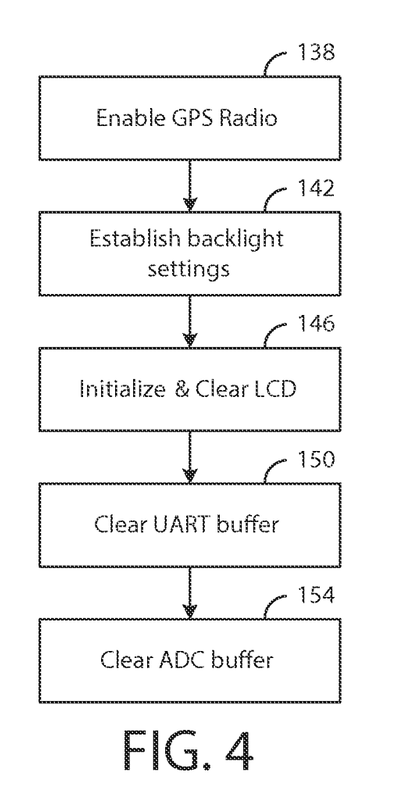
FIG. 4 is a flowchart illustrating the module initialization sequence from FIG. 2.

FIG. 4 is a flowchart illustrating the module initialization sequence from FIG. 2. At act 138, the GPS radio is enabled. At act 142 the backlight settings are established. At act 146 the LCD is initialized and cleared. At act 150 the UART buffer is cleared. At Act 154 the ADC buffer is cleared.

Figure 5:
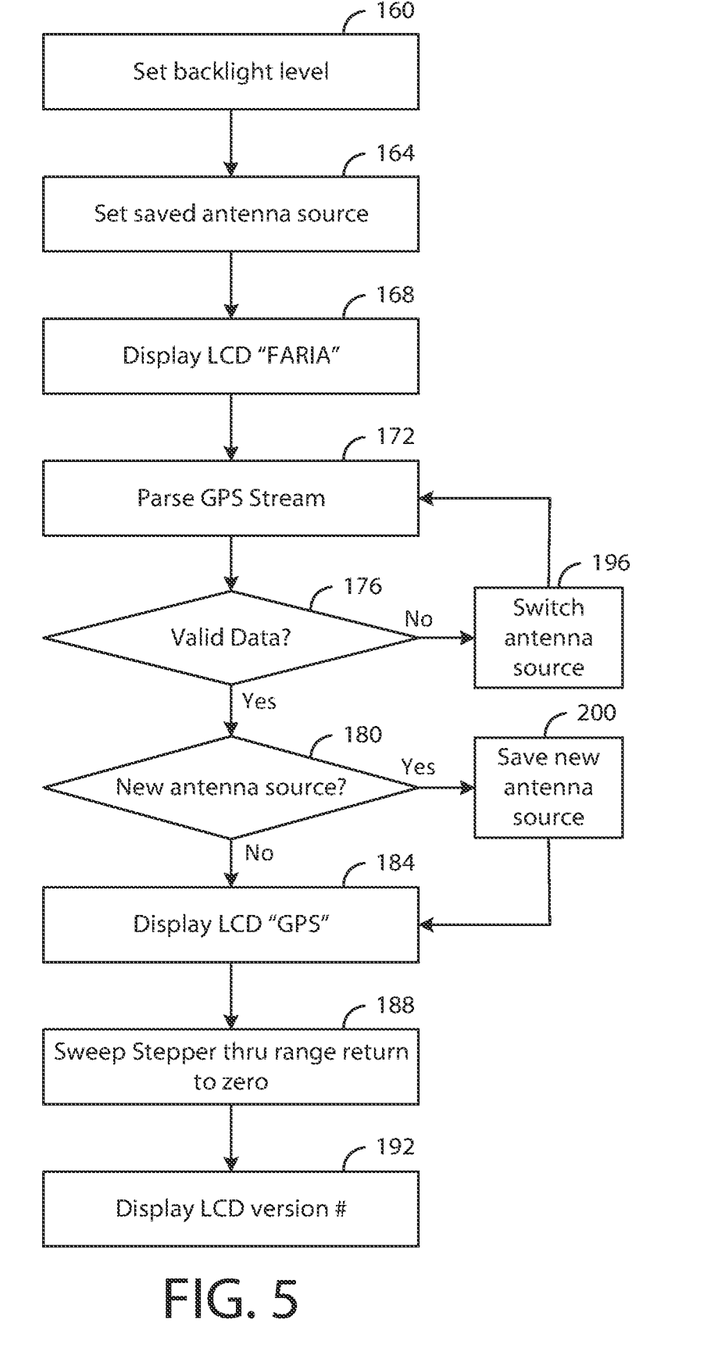
FIG. 5 is a flowchart illustrating the built in self test (BiST) sequence from FIG. 2.

FIG. 5 is a flowchart illustrating the built in selftest (BiST) sequence from FIG. 2. At act 160, the backlight level is set. At act 164, the antenna source is set saved. At act 168 the LCD is set to display FARIA or other manufacturer name, or programed information. At act 172, a GPS data stream is parsed. At query 176, the test determines whether the GPS data stream contains valid data. If the GPS data stream contains valid data, then at query 180 the test determines whether there is a new antenna source. If there is not a new antenna source, then at act 184 the LCD will display "GPS". At act 188, the test will sweep the stepper through range return to zero. In one embodiment, act 188 is indicated physically to the user by the gauge or instrument pointer moving from its position at rest of value zero, through to the full range of the dial (e.g. 70 MPH), and then back to zero. At act 192, the LCD will display the version number of the internal software (i.e. revision). If the data is not valid at query 176, then at act 196 the antenna source is switched. If it is determined that there is a new antenna source at query 180, then at act 200 the new antenna source is saved.

Figures 6, 7:
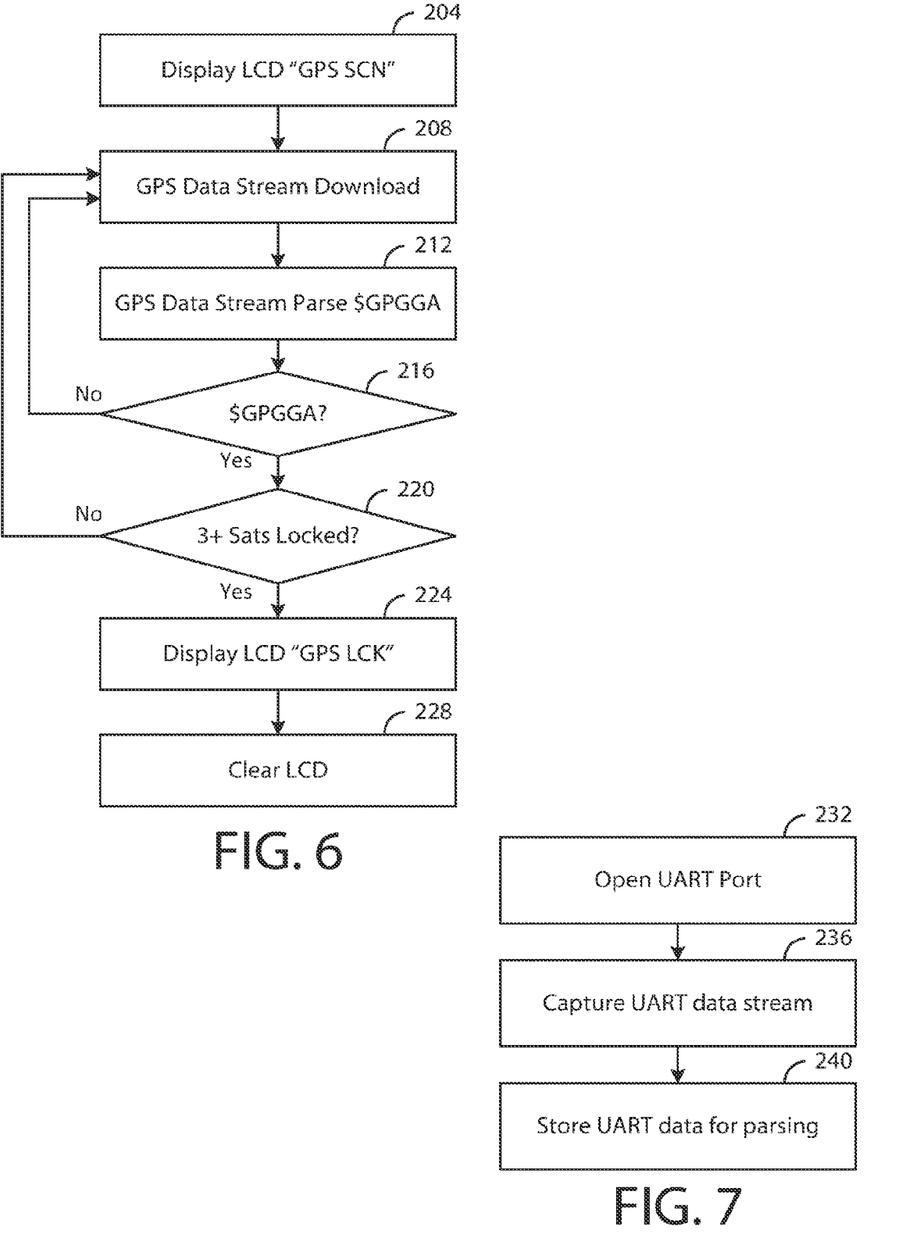
FIG. 6 is a flowchart illustrating the GPS Sat Acquisition sequence from FIG. 2.
FIG. 7 is a flowchart illustrating the GPS Data Stream Download sequence from FIG. 2.

FIG. 6 is a flowchart illustrating the GPS Sat Acquisition sequence from FIG. 2. At act 204, the LCD displays "GPS OK" which means that the internal antenna is successfully communicating with known GPS satellites. At act 208, the GPS data stream is downloaded. At act 212, the GPS data stream is parsed $GPGGA (Global Positioning System Fix Data). At query 216 the system determines whether $GPGGA is made. If $GPGGA is yes, then at query 220, the system determines if 3+ Sats Locked (meaning satellite positional data results in definite location determination). If 3+ Sats locked, then at act 224, the LCD displays "GPS LOCK", which means a 'lock' or successful location position has been determined. At act 228, the LCD is cleared.

FIG. 7 is a flowchart illustrating the GPS Data Stream Download sequence from FIG. 2. At act 232 the UART port is opened. At act 236, the UART data stream is captured. At act 240 the UART data is stored for parsing.

Figure 8:
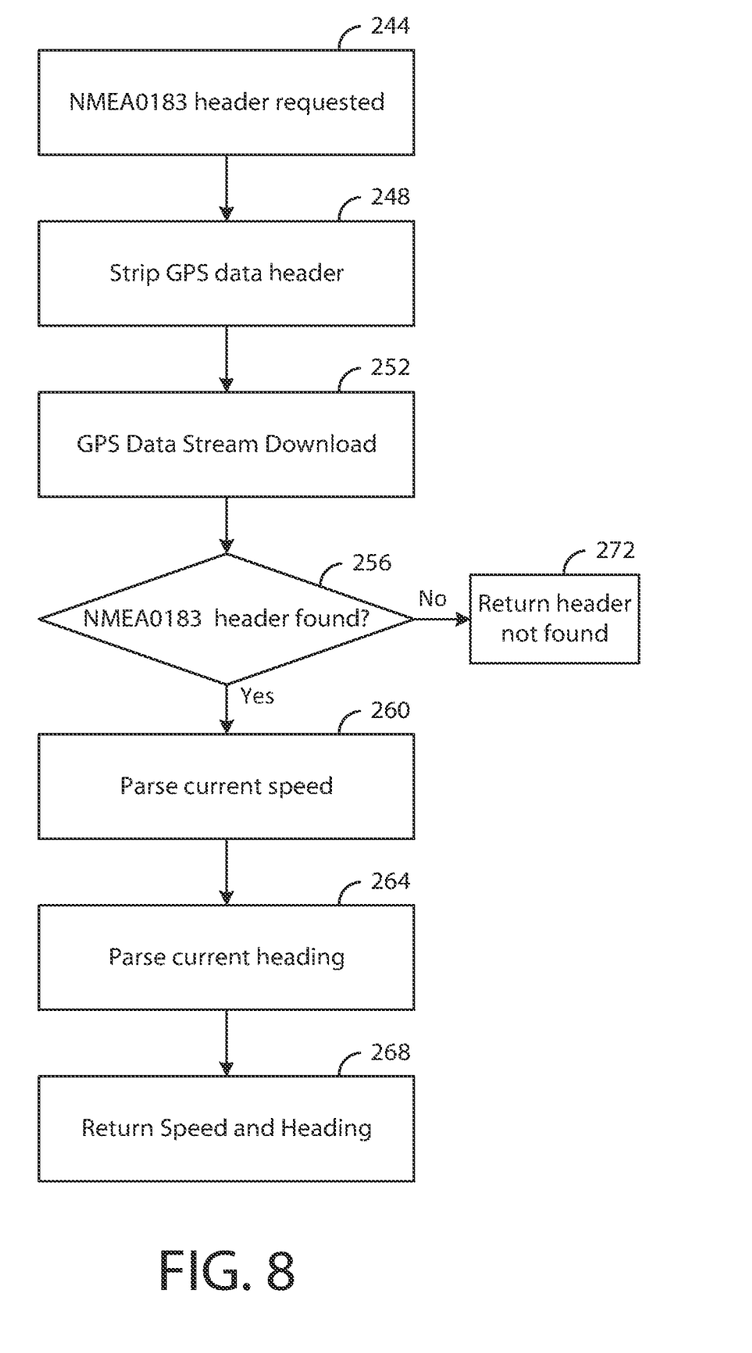
FIG. 8 is a flowchart illustrating the GPS Stream Parse sequence from FIG. 2.
Figure 9:
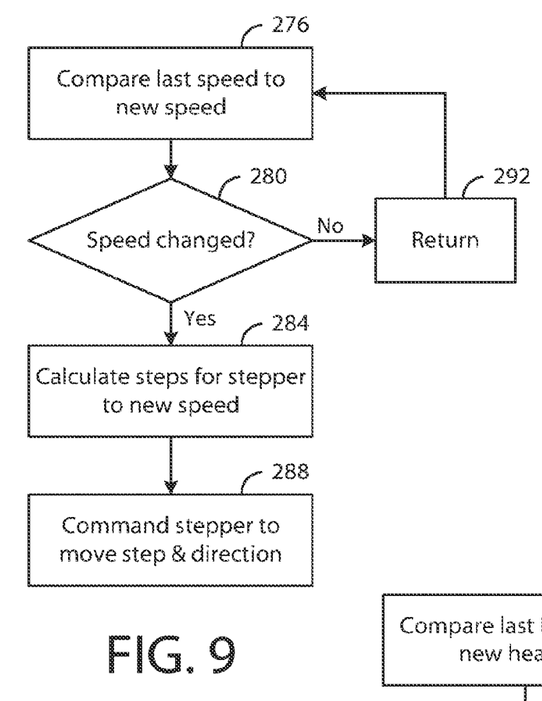
FIG. 9 is a flowchart illustrating the Update Stepper Position sequence from FIG. 2.

FIG. 8 is a flowchart illustrating the GPS Stream Parse sequence from FIG. 2. For background in the succeeding section, NMEA0183 is a communication protocol used in parsing the data for this sequence. At act 244, a NMEA0183 header is requested to establish internal communication integrity. At act 248, the GPS data header is stripped. At act 252 the GPS data stream is downloaded. At query 256, it is determined whether the NMEA0183 header is found, again for communication integrity. If the NMEA0183 header is found, then at act 260, the current speed is parsed, and this equates to moving speed (over ground) of vehicle or vessel. At act 264 the current heading is parsed, which means that the direction of vehicle or vessel is known. At act 268 the speed and heading is returned. If the NMEA0183 header is not found, then at act 272, a return header not found alert is made FIG. 9 is a flowchart illustrating the Update Stepper Position sequence from FIG. 2. At act 276, the system compares a last (previous) speed to a new speed. At query 280, the system determines whether the speed has changed. If the speed has changed, at act 284, the system calculates the steps for stepper to new speed. At act 288, the system commands the stepper to move step and direction. If the speed has not changed, then at act 292 the software flow returns to preceding query algorithm at act 276

Figure 10:
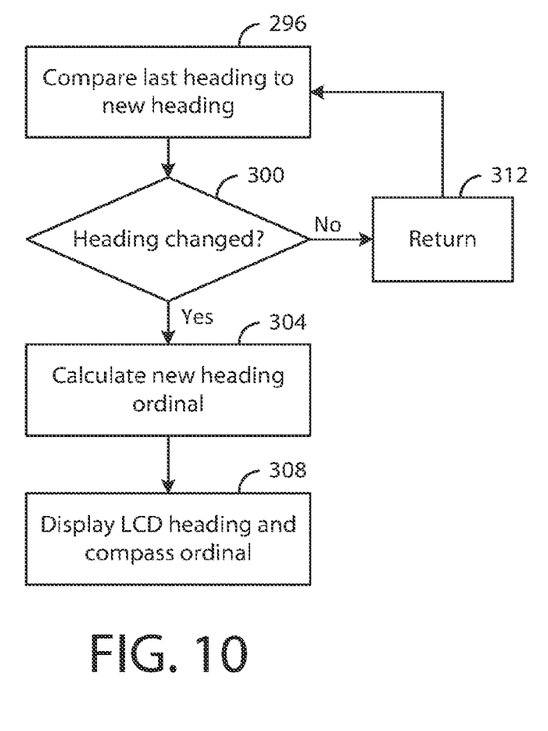
FIG. 10 is a flowchart illustrating the Update LCD Panel sequence from FIG. 2.

FIG. 10 is a flowchart illustrating the Update LCD Panel sequence from FIG. 2. At act 296, the system compares a last (previous) heading to a new heading. At query 300, the system determines whether the heading has changed. If the heading has changed, then at act 304 the system calculates a new heading ordinal. At act 308 the LCD displays the heading and compass ordinal. If the heading has not changed, then at act 312 the software flow returns to preceding query algorithm at act 296. In other embodiment, at act 312 the LCD may simply continue to display the current heading.

Figure 11:
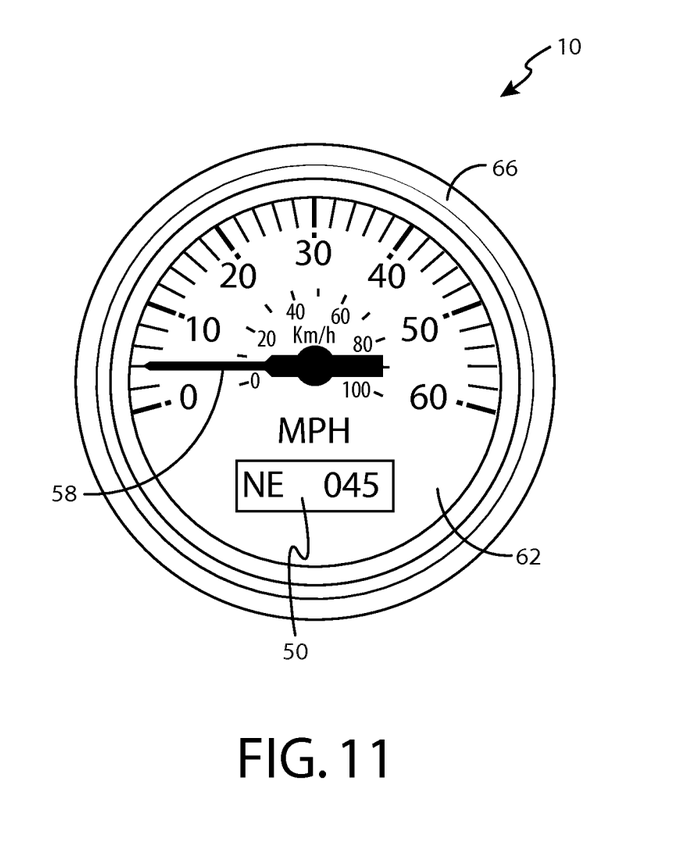
FIG. 11 is a front view of the speedometer.

FIG. 11 is a front view of the speedometer 10. The speedometer comprises a housing 66. The gauge dial face 62 is located on the housing in a location where it will be visible to users on the vessel or vehicle. The gauge pointer 58, and LCD 50 are visible in this view.

Figure 12:
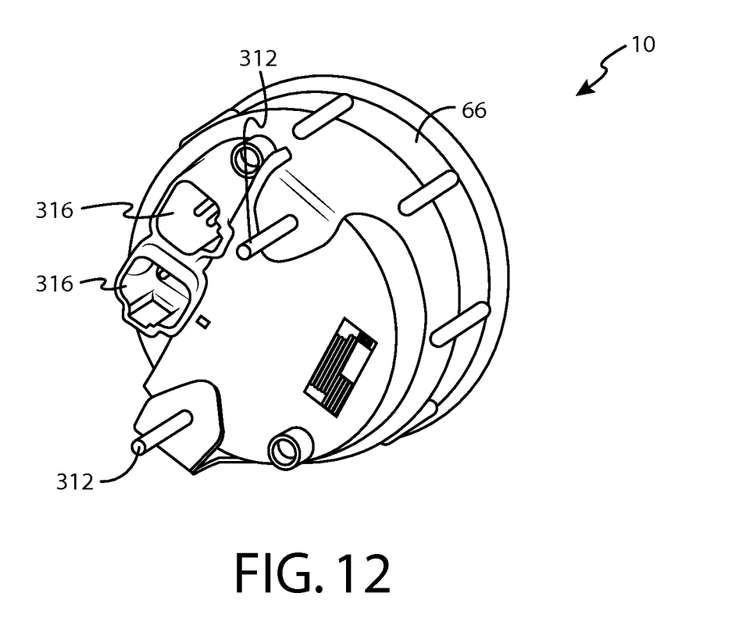
FIG. 12 is a rear perspective view of the speedometer.

FIG. 12 is a rear perspective view of the speedometer 10. One or more threaded attachment posts 312 may protrude from the rear of the housing 66. The posts 312 may be used to attach the speedometer to the vessel or vehicle, for instance to the dashboard of the vessel or vehicle. The rear of the housing may have one or more receptacles 316 configured to attach to a data communication device and/or power line, or the rear housing may present the means of data and power connection as threaded fasteners. The data communication device may include, but is not limited to a cable, wire, transmitter, and/or receiver.

Figure 13:
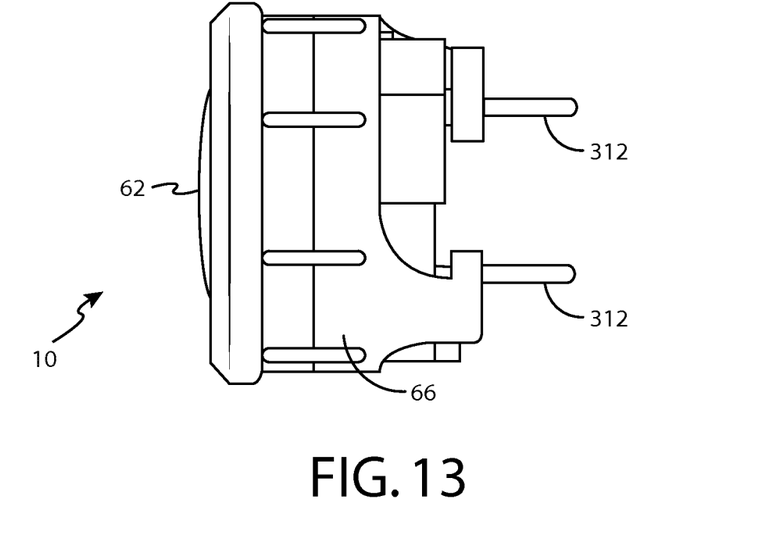
FIG. 13 is a side view of the speedometer.

FIG. 13 is side view of the speedometer 10.

The GPS speedometer may be offered in a number of popular styles to match the colors in a variety vessels and vehicles. An added advantage is there are no instruments for determining speed or direction in the water that can corrode, malfunction, or break.

The GPS speedometer may be configured to be a drop-in replacement for a vessel or vehicle's current speedometer and can be made to match the existing instrument dash. GPS information is gathered from an internal GPS antenna. No external antenna required. The disclosed GPS Speedometer may use a highly accurate 48 channel GPS receiver. Course Over Ground (COG) and actual heading (compass heading over ground) may be displayed on the optional digital LCD. Speed data is shown by an analog pointer, in one embodiment. The pointer is driven by a digital stepper motor for increased accuracy and minimized pointer bounce during vessel operation. The LCD displays heading and compass and may be back-lit for readability in inclement weather. The LCD displays Compass Rose headings and actual course over ground heading. Heading may be updated in about 1° increments. The GPS Speedometer may have a speed accuracy of +/−1 MPH while moving and a hot (normal stand-by) start up time (TTFF—time to first fix) of about 1 second or a TTFF from a cold (no power applied) start of up to about 30 seconds. Heading accuracy is about +/−1 Degree. The dial face may be illuminated with a premium LED lighting system. The housing may be molded from Polycarbonate plastic with integrated Deutsch style connector shells (sockets) and may be sealed against water intrusion in accordance with Ingress Protection (IP) rating IP67. Wires may terminate to a sealed Deutsch weatherproof connector. This wire configuration allows the GPS speedometer to work as a Plug and Play addition to a current dash. The GPS speedometer may be available in multiple Speed ranges to 80 MPH, 130 KPH, 50 and 70 KNOTS. The LED may have back-lit or edge-lit dials. The GPS speedometer may have an ultra-fast satellite acquisition time (TTFF) 1 second from Hot start. The disclosed GPS speedometer may be an ideal replacement for speed sensing devices (pitot tube and paddle wheel) that typically fail over time. The disclosed GPS speedometer is suitable for slow moving vessels where pitot tubes typically do not work. The GPS speedometer may be configured to be salt spray resistant due to the fact that the front may be configured to be corrosion resistant per ASTM B117-73. The GPS speedometer may be weather resistant in accordance with IP67 standards. The GPS speedometer may also be offered in a version without LCD, but where all other functions are as explained herein.

This invention has many advantages. The GPS speedometer has an internal GPS antenna, thus there is no need to install and wire an external GPS antenna and power source, thereby saving money and time. Also, since the GPS antenna is located within the GPS speedometer housing, there is no issue with damage to the GPS antenna, wiring, and power supply due to exposure to sea water and other elements. The GPS speedometer installs quickly and easily into standard speedometer on a vehicle instrument panel. The GPS speedometer shows the vehicle's speed and heading on a single easy to read display. Since this invention contains constant access to the vehicle or equipment power source, TTFF will remain quick as this constant power source enables the device to retain memory of last known location.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:
1. A global positioning system speedometer comprising:
a housing;
a circuit board located in the housing;
a microprocessor located on the circuit board;
protection circuitry located on the circuit board, and in signal communication with the microprocessor, and a power connector configurable to be in physical communication with a power supply external to the global positioning system speedometer;
an entire global positioning system receiver located inside the housing, the global positioning system receiver comprising:
a global positioning system module located on the circuit board and in signal communication with the micro-processor,
a global positioning system antenna located on the circuit board and in signal communication with global positioning system module; and
a readable speedometer display located on the housing and in signal communication with the microprocessor, wherein the readable speedometer display is configured to display the current speed of the vessel or vehicle calculated by the microprocessor based on data from a global positioning system;
wherein the global position system speedometer has only one physical power connection or physical data connection with any component outside of the global position system speedometer housing when in operation, the one physical power connection or physical data connection being the power connector configurable to be in physical communication with a power supply.

2. The global positioning system speedometer of claim 1, further comprising:
a power regulator located on the circuit board and in signal communication with the microprocessor;
a stepper motor located in the housing and signal communication with the microprocessor; and
a gauge pointer located in the readable speedometer display, and in operable communication with the stepper motor.

3. The global positioning system speedometer of claim 1, further comprising:
a display driver located on the circuit board and in signal communication with the microprocessor, and
a liquid crystal display located on the readable speedometer display, and in communication with the display driver, and wherein the liquid crystal display is configured to provide a numeric representation of course over ground compass cardinal heading, and wherein the liquid crystal display is configured to display the current numeric representation of course over ground compass cardinal heading of the vessel or vehicle calculated by the microprocessor based on data from a global positioning system.

4. The global positioning system speedometer of claim 1, wherein the microprocessor is programmed to perform the following:
undergoing a bootup sequence;
initializing modules;
undergoing a built-in self-test;
acquiring global positioning system satellite;
downloading global positioning system data stream;
parsing global positioning system data stream parse recommended minimum specific global positioning system/transit data;
updating stepper position with a correct speed over ground reading;
updating liquid crystal display with the correct heading;
determining whether ignition is on;
placing system in high power mode if ignition is on; and
placing system in low power mode if ignition is off.

5. The global positioning system speedometer of claim 4, wherein the bootup sequence comprises the following:
initializing the microcontroller;
initializing a system clock;
initializing a general-purpose input/output;
initializing an analog to digital controller; and
initializing a universal asynchronous receiver/transmitter.

6. The global positioning system speedometer of claim 4, wherein the initializing modules act comprises the following:
enabling a global positioning system radio;
establishing backlight settings;
initializing and clearing the liquid crystal display;
clearing the universal asynchronous receiver/transmitter buffer; and
clearing the analog to digital controller.

7. The global positioning system speedometer of claim 4, where the undergoing a built-in self-test act comprises the following:
setting backlight level;
setting saved antenna source;
displaying on the liquid crystal display "FARIA" or other manufacturer name, or programed information;
parsing global positioning system data stream;
determining whether the global positioning system data stream contains valid data;
determining whether there is a new antenna source, if the global positioning system data stream contains valid data;
displaying on the liquid crystal display "global positioning system", if there is not a new antenna source;
sweeping the stepper through range return to zero;
displaying on the liquid crystal display a version number;
switching antenna source, if the global positioning system data stream does not contain valid data; and
saving new antenna source, if there is a new antenna source.

8. The global positioning system speedometer of claim 4, where the acquiring global positioning system satellite act comprises the following:
displaying on the liquid crystal display that the internal antenna is successfully communicating with known GPS satellites;
downloading a global positioning system data stream;
parsing the global positioning system data stream global positioning system fix data;
determining whether global positioning system fix data;
determining if satellite positional data results in definite location determination, if global positioning system fix data is yes;
displaying on the liquid crystal display that there is a lock or successful location position has been determined, if satellite positional data results in definite location determination; and
clearing the liquid crystal display.

9. The global positioning system speedometer of claim 4, where the downloading global positioning system data stream act comprises the following:
opening the universal asynchronous receiver/transmitter port;
capturing the universal asynchronous receiver/transmitter data stream; and
storing the universal asynchronous receiver/transmitter data for parsing.

10. The global positioning system speedometer of claim 4, where the PARSING global positioning system DATA STREAM PARSE recommended minimum specific global positioning system/transit data act comprises the following:
requesting a communication protocol used in parsing data header;
stripping a global positioning system data header;
downloading a global positioning system data stream;
determining whether the communication protocol used in parsing data header is found;
parsing the current speed, if the communication protocol used in parsing data header is found;
parsing the current heading;
returning the speed and heading; and
initiating a return header not found, if the communication protocol used in parsing data header is not found.

11. The global positioning system speedometer of claim 4, where the updating stepper position with a correct speed over ground reading act comprises the following:
comparing last speed to a new speed;
determining whether the speed has changed;
calculating the steps for the stepper to new speed, if the speed has changed;
commanding stepper to move step and direction;
returning to act of comparing last speed to a new speed if the speed has not changed.

12. The global positioning system speedometer of claim 4, where the updating liquid crystal display with the correct heading act comprises the following:

comparing last heading to a new heading;
determining whether the heading has changed;
calculating a new heading ordinal, if the heading has changed;
displaying on the liquid crystal display the heading and compass ordinal;
returning to the comparing last heading to a new heading act if the heading has not changed.

13. A global positioning system speedometer system comprising:
a vessel, the vessel comprising an instrument panel;
a power supply located on the vessel;
a global positioning system speedometer located on the instrument panel, the global positioning system speedometer comprising:
  a housing;
  a circuit board located in the housing;
  a microprocessor located on the circuit board;
  an entire global positioning system receiver located inside the housing, the global positioning system receiver comprising:
    a global positioning system module located on the circuit board and in signal communication with the micro-processor;
    a global positioning system antenna located on the circuit board and in signal communication with global positioning system module;
  protection circuitry located on the circuit board, in signal communication with the microprocessor, and in physical power connection with the power supply;
  a readable speedometer display located on the housing and in signal communication with the microprocessor, wherein the readable speedometer display is configured to display the current speed of the vessel or vehicle calculated by the microprocessor based on data from a global positioning system; and
a global positioning satellite in signal communication with the global positioning system antenna;
wherein the global position system speedometer has only one physical power connection or physical data connection with any component outside of the global position system speedometer housing, the one physical power connection or physical data connection being the physical power connection between the protection circuitry and the power supply.

14. The global positioning system speedometer system of claim 13, wherein
the global positioning system speedometer further comprise:
a power regulator located on the circuit board and in signal communication with the microprocessor;
a stepper motor located in the housing and signal communication with the microprocessor, and
a gauge pointer located in the readable speedometer display, and in operable communication with the stepper motor.

15. The global positioning system speedometer system of claim 13, wherein the global positioning system speedometer further comprises:
a display driver located on the circuit board and in signal communication with the microprocessor, and
a liquid crystal display located on the readable speedometer display, and in communication with the display driver, and wherein the liquid crystal display is configured to provide a numeric representation of course over ground compass cardinal heading, and wherein the liquid crystal display is configured to display the current numeric representation of course over ground compass cardinal heading of the vessel or vehicle calculated by the microprocessor based on data from a global positioning system.

16. The global positioning system speedometer system of claim 13, wherein the microprocessor is programmed to perform the following:
undergoing a bootup sequence;
initializing modules;
undergoing a built-in self-test;
acquiring global positioning system satellite;
downloading global positioning system data stream;
parsing global positioning system data stream parse recommended minimum specific global positioning system/transit data;
updating stepper position with a correct speed over ground reading;
updating liquid crystal display with the correct heading;
determining whether ignition is on;
placing system in high power mode if ignition is on; and
placing system in low power mode if ignition is off.

* * * * *